(12) United States Patent
Rauschmayer et al.

(10) Patent No.: US 8,245,061 B2
(45) Date of Patent: Aug. 14, 2012

(54) SYSTEMS AND METHODS FOR OPERATIONAL POWER MANAGEMENT UTILIZING POWER ISLANDS

(75) Inventors: Richard Rauschmayer, Longmont, CO (US); Steven E. Strauss, Orefield, PA (US); Tatsuya Sakai, Kanagawa (JP)

(73) Assignee: Agere Systems Inc., Allentown, PA (US)

( * ) Notice: Subject to any disclaimer, the term of this patent is extended or adjusted under 35 U.S.C. 154(b) by 183 days.

(21) Appl. No.: 12/772,108

(22) Filed: Apr. 30, 2010

(65) Prior Publication Data
US 2010/0218020 A1 Aug. 26, 2010

Related U.S. Application Data

(62) Division of application No. 11/534,305, filed on Sep. 22, 2006, now Pat. No. 7,739,533.

(51) Int. Cl.
*G06F 1/32* (2006.01)
*G06F 1/00* (2006.01)

(52) U.S. Cl. ............... 713/320; 713/300; 713/322

(58) Field of Classification Search ............ 713/320
See application file for complete search history.

(56) References Cited

U.S. PATENT DOCUMENTS

| | | | |
|---|---|---|---|
| 4,835,481 A * | 5/1989 | Geissler et al. | 327/156 |
| 5,034,624 A * | 7/1991 | Flaherty et al. | 327/142 |
| 5,544,138 A | 8/1996 | Bajorek et al. | |
| 5,550,489 A * | 8/1996 | Raab | 326/93 |
| 5,715,467 A | 2/1998 | Jirgal | |
| 5,848,281 A * | 12/1998 | Smalley et al. | 713/322 |
| 6,275,553 B1 * | 8/2001 | Esaki | 375/371 |
| 6,559,696 B1 * | 5/2003 | Heitmann et al. | 327/156 |
| 6,775,787 B2 | 8/2004 | Greene | |
| 6,973,583 B2 | 12/2005 | Kobori | |
| 6,983,389 B1 | 1/2006 | Filippo | |
| 7,055,117 B2 | 5/2006 | Yee | |
| 7,194,644 B2 * | 3/2007 | Durand et al. | 713/320 |
| 7,203,857 B2 | 4/2007 | Hamilton | |
| 7,489,175 B2 * | 2/2009 | Akasaka | 327/291 |
| 7,739,533 B2 | 6/2010 | Rauschmayer | |
| 7,873,823 B2 | 1/2011 | Shankar | |
| 2004/0060024 A1 | 3/2004 | Bednar et al. | |
| 2004/0255177 A1 | 12/2004 | Hamilton | |
| 2005/0163237 A1 | 7/2005 | Katanaya | |

(Continued)

FOREIGN PATENT DOCUMENTS

WO WO 2004/023268 3/2004

OTHER PUBLICATIONS

U.S. Appl. No. 12/425,507, filed Apr. 17, 2009, Nation et al.

(Continued)

*Primary Examiner* — Suresh Suryawanshi
(74) *Attorney, Agent, or Firm* — Hamilton, DeSanctis & Cha (57) ABSTRACT

Various systems and methods for power management are disclosed herein. For example, a synchronous semiconductor circuit is disclosed that includes two or more clock sources and a power management controller. The power management controller is operable to apply power to one of the clock sources and to select another of the clock sources for synchronization of the circuit. Then, upon stabilization of the first clock source, it is selected by the power management controller to synchronize the circuit.

20 Claims, 9 Drawing Sheets

U.S. PATENT DOCUMENTS

| | | |
|---|---|---|
| 2005/0174076 A1 | 8/2005 | Katanaya |
| 2006/0107077 A1 | 5/2006 | Roth et al. |
| 2006/0123259 A1 | 6/2006 | Yokota et al. |
| 2006/0230299 A1 | 10/2006 | Zaretsky et al. |
| 2007/0006012 A1 | 1/2007 | Mosur et al. |
| 2008/0077818 A1 | 3/2008 | Rauschmayer et al. |
| 2010/0205462 A1 | 8/2010 | Rauschmayer et al. |
| 2010/0218020 A1 | 8/2010 | Rauschmayer et al. |
| 2010/0268917 A1 | 10/2010 | Nation et al. |

OTHER PUBLICATIONS

U.S. Appl. No. 12/425,532, filed Apr. 17, 2009, Nation et al.
U.S. Appl. No. 12/425,547, filed Apr. 17, 2009, Nation et al.

* cited by examiner

SYSTEMS AND METHODS FOR OPERATIONAL POWER MANAGEMENT UTILIZING POWER ISLANDS

CROSS REFERENCE TO RELATED APPLICATIONS

The present application is a divisional application of (claims priority to) U.S. patent application Ser. No. 11/534,305 entitled "Systems and Methods for Operational Power Management" and filed Sep. 22, 2006 now U.S. Pat. No. 7,739,533 by Rauschmayer et al.

Further, the present application is related to PCT Application No. PCT/US06/27931 entitled "Systems and Methods for Modular Power Management", and filed by Rauschmayer et al. on Jul. 18, 2006 and designating the United States. The aforementioned PCT Application has been nationalized in the United States as U.S. patent application Ser. No. 12/280,790.

All of the aforementioned applications are assigned to an entity common hereto, and is incorporated herein by reference for all purposes.

BACKGROUND OF THE INVENTION

The present invention is related to systems and methods for managing power dissipation in electrical systems, and in particular to systems and methods for managing power consumption of a hard disk drive system.

A hard disk drive is a complex electrical-mechanical system that is further complicated due to both power concerns and heat dissipation issues. These power concerns and heat dissipation issues have been addressed from various individual perspectives including low power application specific semiconductor design; or use of one of hardware, firmware, or software to reduce clocking speeds. As one example, some hard disk drives rely on gating an overall system clock and/or completely removing power to reduce power dissipation. While such an approach operates to reduce power consumption, the effects are often drastic and can take considerable time to reverse when hard disk drive operation is again required.

Thus, for at least the aforementioned reasons, there exists a need in the art for advanced systems and methods for power management.

BRIEF SUMMARY OF THE INVENTION

The present invention is related to systems and methods for managing power dissipation in electrical systems, and in particular to systems and methods for managing power consumption of a disk drive.

Some embodiments of the present invention provide synchronous semiconductor circuits. The circuits include two or more clock sources and a power management controller. The power management controller is operable to apply power to one of the clock sources and to select another of the clock sources for synchronization of the circuit. Then, upon stabilization of the first clock source, it is selected by the power management controller to synchronize the circuit. In some cases of the aforementioned embodiments, the initially selected clock source is a ring oscillator and the latter selected clock source is a crystal oscillator. In a particular case, the aforementioned ring oscillator provides a stable clock output more quickly than the crystal oscillator.

In some cases, the circuit further includes a phase locked loop circuit that may be used to lock to one or more of the crystal oscillator and the ring oscillator. In such cases, the phase locked loop may be initially used to lock to the initial clock source, and then later used to lock to the latter clock source. Alternatively, the phase locked loop may be used only to lock to the latter selected clock source. In some cases, the latter selected clock source is associated with a power island. In such cases, applying power to the latter selected clock source includes applying power to the power island. In some cases, the power management controller is further operable to remove power from the power island such that power is removed from the associated clock source.

Other embodiments of the present invention provide a state predictive power management system. Such a power management system includes two or more event circuits. Each of the event circuits includes functionality associated with a respective event. In addition, the power management system includes a number of event clocks with each of the event clocks being associated with one or more of the respective event circuits. Also included is a power management controller with a state prediction module and clock control circuits. The state prediction module is operable to predict the occurrence of two or more events, and the clock circuits are each operable to provide the aforementioned event clocks based on the predictions of the state prediction module. In some cases, the events are portions of an overall operation such as, for example, a read from a hard disk drive, a write to a hard disk drive, an actuator servo operation, or a spindle motor servo operation. In such cases, the events may proceed sequentially with one event starting successively after a preceding event. In some cases, the clock control circuits include gates for gating the respective clocks with an enable signal. In other cases, clock selection is done using a clock drive crossbar circuit. In one particular instance of the aforementioned embodiments, the circuit further two or more clock sources. In such cases, the power management controller may additionally include a clock selection circuit that is operable to apply power to one of the clock sources and to select the second clock source to drive both of the aforementioned event clocks. Upon stabilization of the recently powered clock source, it is chosen to drive both of the aforementioned event clocks.

Yet other embodiments of the present invention provide methods for power management that include providing multiple event circuits each associated with a particular event clock. The occurrence of the ongoing events are predicted and as they are predicted, an event clock associated with circuitry implementing a predicted event is enabled. Yet further embodiments of the present invention provide methods for rapid circuit synchronization. The methods include providing two or more clock sources, applying power to one of the clock sources, and selecting another of the clock sources for circuit synchronization. Then, upon stabilization of the recently powered clock source, it is selected for circuit synchronization.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for managing power dissipation in electrical systems, and in particular to systems and methods for managing power consumption of a hard disk drive system.

A great number of computer devices employ hard disk drives. For example, hard disk drives are commonly incorporated into personal computers including both desktop and laptop computers. In addition, a number of consumer electronic devices are beginning to incorporate hard disk drives as a mechanism for increasing storage capacity for the device. For example, it is becoming common for digital video cameras, digital still cameras, personal digital assistants, cellular telephones and the like to incorporate hard disk drives. The devices are often being operated at very high clock speeds and demand relatively low access times for data from an associated hard disk drive. High speed hard disk drives may be implemented by increasing the rate at which data carrying platters are rotated in relation to a read/write head assembly. As these platters are connected to a rotating spindle, the speed at which the platters are rotating is often referred to as spindle speed. Increasing the spindle speed not only increases the rate at which data can be accessed from the platter during sequential accesses, but also reduces the rotational latency resulting in a reduction in the average time required to perform a random data access. Because of the advantages of increased spindle speed, there continues to be a push to further increase spindle speeds.

Increasing spindle speed results in an increase in vibration energy and heat energy each of which is detrimental to operation of a hard disk drive. By introducing effective power management, the increase in heat energy can be mitigated allowing for the increased performance of a hard disk drive. While power management is paramount in hard disk drives destined for deployment in mobile consumer electronics devices, power management is also of appreciable importance for hard disk drives destined for deployment in larger, less mobile devices such as laptop personal computers and even enterprise applications. In addition, reducing power dissipation has a positive impact on battery life which is another important consideration when deciding whether or not to include a hard disk drive system within a mobile electronic device.

Some embodiments of the present invention provide synchronous semiconductor circuits. The circuits include two or more clock sources and a power management controller. As used herein, the phrase "clock source" is use in its broadest sense to mean any source of a repeating signal. Thus, for example, a clock source may be a crystal oscillator or a ring oscillator. Alternatively, a clock source may be an external signal feeding the circuit. Based on the disclosure provided herein, one of ordinary skill in the art will recognize a variety of clock sources that may be utilized in accordance with one or more embodiments of the present invention. The power management controller is operable to apply power to one of the clock sources and to select another of the clock sources for synchronization of the circuit. Then, upon stabilization of the first clock source, it is selected by the power management controller to synchronize the circuit. As used herein, the term "stabilization" is used in its broadest sense to mean any reasonably predictable state. Thus, for example, a clock may be considered stable when it is operating within a desired frequency range, and/or is providing a consistent output amplitude.

Other embodiments of the present invention provide a state predictive power management system. Such a power management system includes two or more event circuits. As used herein, the phrase "event circuit" is used in its broadest sense to mean any circuit including functionality to perform processing associated with a particular event. Further, as used herein, the term "event" is used in its broadest sense to mean a subset of processing associated with an overall operation. Thus, an operation may consist of a number of events. Thus, for example, an event may perform some level of processing required to a read operation from a hard disk drive. In addition, the power management system includes a number of event clocks. These event clocks are used to drive the circuitry of particular events. The system also includes power management controller with a state prediction module, and clock control circuits. The state prediction module is operable to predict the occurrence of two or more events, and the clock circuits are each operable to provide the aforementioned event clocks based on the predictions of the state prediction module.

Figure 1:
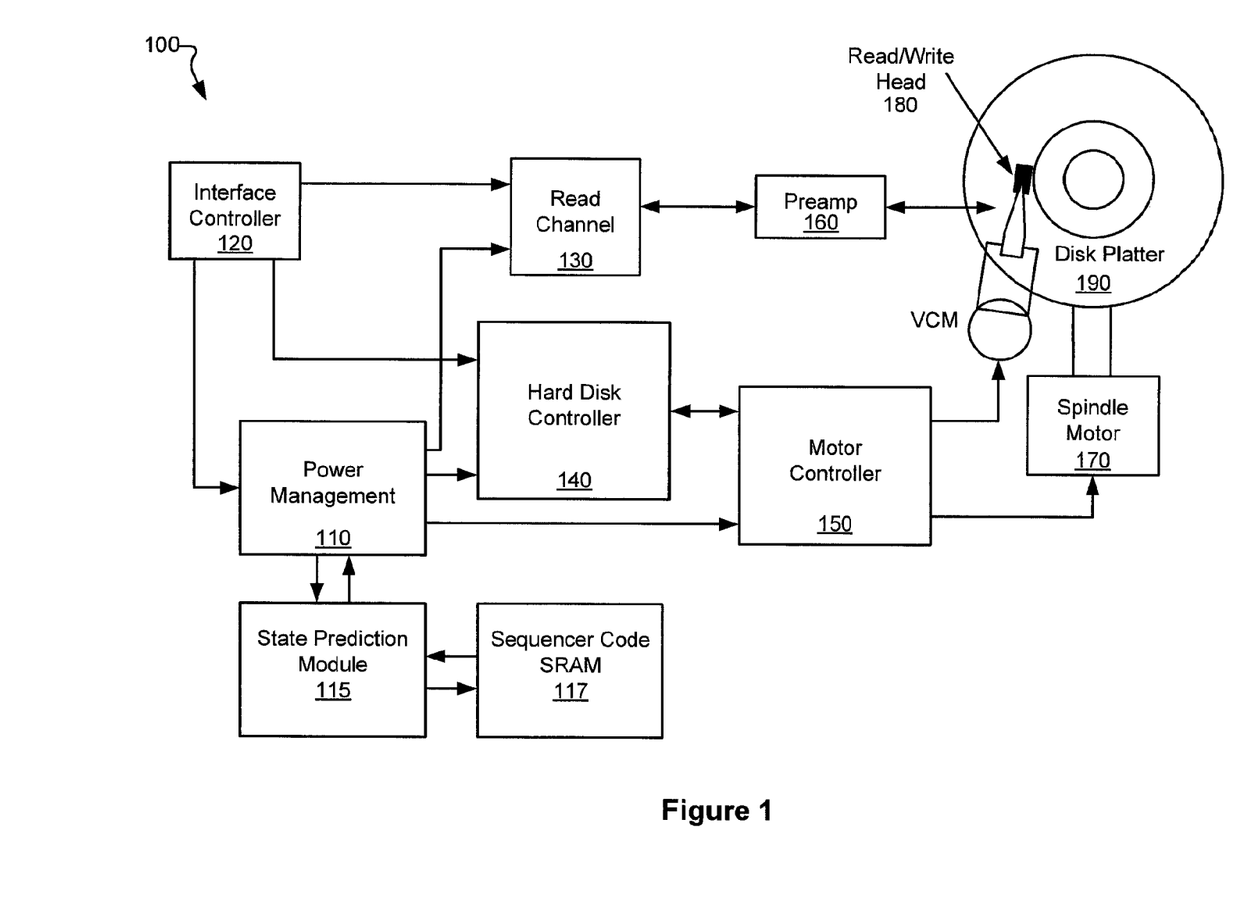
FIG. 1 depicts a hard drive system including a state prediction module and a sequencer code memory in accordance with various embodiments of the present invention.

Turning to FIG. 1, a hard disk drive system 100 is depicted that includes a state prediction module 115 and a sequencer code memory 117 in accordance with various embodiments of the present invention. In some embodiments of the present invention, state prediction module 115 and sequencer code memory 117 are used in relation to a power management module 110 that is more fully described in the PCT Patent Application entitled "Systems and Methods for Modular Power Management" that was incorporated above by reference. In addition to power management module 110, state prediction module 115 and sequencer code memory 117, hard disk drive system 100 includes an interface controller 120, a read channel module 130, a hard disk controller 140, a motor controller 150, a preamp 160, a spindle motor 170, a read/write head assembly 180, and a disk platter 190.

Interface controller 120 may be any interface tailored to allow commands to pass to and/or from a host controller. Thus, host interface controller may be, but is not limited to, an ATA interface controller, an SATA interface controller, an MMC interface controller, a CE-ATA interface controller, or an SDIO interface controller. Based on the disclosure provided herein, one of ordinary skill in the art will recognize a variety of interface controllers that may be implemented in relation to one or more embodiments of the present invention.

The data on disk platter 190 consists of groups of magnetic signals that may be detected by read/write head assembly 180 when the assembly is properly positioned over disk platter 190. In a typical read operation, read/write head assembly 180 is accurately positioned by motor controller 150 over a desired data track on disk platter 190. Motor controller 150 both positions read/write head assembly 180 in relation to disk platter 190 and drives spindle motor 170 by moving read/write head assembly to the proper data track on disk platter 190 under the direction of hard disk controller 140. Spindle motor 170 spins disk platter 190 at a determined spin rate (RPMs).

Once read/write head assembly 190 is positioned adjacent the proper data track, magnetic signals representing data on disk platter 190 are sensed by read/write head assembly 180 as disk platter 190 is rotated by spindle motor 170. The sensed magnetic signals are provided as a continuous, minute analog signal representative of the magnetic data on disk platter 190. This minute analog signal is transferred from read/write head assembly 180 to read channel module 130 via preamp 160. Preamp 160 is operable to amplify the minute analog signals accessed from disk platter 190. In addition, preamp 160 is operable to amplify data from read channel module 130 that is destined to be written to disk platter 190. In turn, read channel module 130 digitizes the received analog signal to recreate the digital data originally written to disk platter 190. The digitized data is provided via interface controller 120 to a host computer or device governing operation of hard disk drive system 100.

A write operation is substantially the opposite of the preceding read operation with digital data being received from a host via interface controller 120. The digital data is provided to read channel module 130 and to hard disk controller 140. Hard disk controller 140 commands the proper positioning of read/write head assembly 180 adjacent a particular data track on data platter 190 and the desired rotational speed of disk platter 190 via motor controller 150. Once the aforementioned commands are implemented, the digital data is converted to an analog data stream by read channel module 130 and provided to read/write head assembly via preamp 160. In turn, read/write head assembly 180 writes the data to disk platter 190.

In various cases, the previously described read and write operations are not continuously utilized, and thus there is an opportunity for power management. Power management module 110 provides such power management to hard disk drive system 100. In some particular embodiments of the present invention, power management module 110 provides programmable power management to provide greater drive energy efficiency while satisfying desired system performance. Further, the addition of state prediction module 115 and sequencer code memory 117 provide an ability to control active power utilization of hard disk drive system 100, and also to reduce the response time of hard disk drive system 100. As used herein, the phrase "active power" is used in its broadest sense to mean any power utilized when hard disk drive system is in an active or operational mode as compared to a sleep or other power down mode.

In some embodiments of the present invention, state prediction module 115 provides indications to power management module 110 of upcoming or predicted states of operation. This provides an ability for power management module 110 to implement event driven sequencing in addition to oscillation sourcing. As used herein, the phrase "event driven sequencing" is used in its broadest sense to mean any process wherein events are predicted allowing for the application and removal of clocks from circuitry associated with a particular event. As used herein, the phrase "oscillation sourcing" is used in its broadest sense to mean any operation whereby an oscillation source is brought online or taken offline. Thus, for example, oscillation sourcing may include the processes of applying power and removing power from a crystal oscillator.

Power management module 110 may be a stand-alone circuit that acts to distribute clocks and enables to the other major sub-blocks within hard disk drive system 100. In some embodiments of the present invention, power management module 110 supports a number of registers that allow firmware executing on hard disk controller 140 to control the power distribution to various other circuitry of hard disk drive system 100. Power management module 110 may utilize a number of power management techniques in concert to control the overall power dissipation of hard disk drive system 100. In one particular embodiment of the present invention, power management module 110 includes an ability to enable and disable the overall system clock synchronizing operation of hard disk drive system 100. In one particular case, such an ability may be provided by gating the overall system clock, while in other cases the aforementioned ability may be providing by removing power from an oscillator circuit responsible for generating the overall system clock. In addition, power management module 110 may include an ability to enable and disable sub-clocks of the of the overall system clock. Thus, for example, power management module 110 may include an ability to disable a clock provided to read channel module 130, and to simultaneously enable a clock provided to interface controller 120. The aforementioned ability is adequate for managing power between operational and non-operational modes of hard disk drive 100 providing significant power savings when hard disk drive system 100 is not being used, or exhibits prolonged periods of inactivity. However, additional power savings may be garnered through consideration of power dissipation within an operational or active mode.

Some embodiments of the present invention provide an ability to minutely manage power dissipation in an operational or active state through use of state prediction module 115 operating in concert with power management module 110. In particular, hard disk drive system 100 may be implemented using individual clocks each associated with circuitry designed to perform a certain function or event. There may be many such events with associated circuitry that when combined provide the operational functionality of hard disk drive system 100. As one example, a read operation may be comprised of ten or more events performed sequentially to implement the read operation. Some of the ten or more events may be reused to perform other operations such as, for example, a write operation. When the event is to be performed, a clock provided to the circuitry associated with the event is enabled and begins clocking. Once the event is completed, the clock is stopped. In this way, power dissipated by circuitry associated with particular events is limited. Power management module 110 receives timing information from state prediction module 115 that allows it to enable and disable clocks directed to the various event related circuitry whenever the particular clock is needed.

The aforementioned approaches of clock gating and/or clock turn-off can be used to dramatically reduce the amount of dynamic power dissipated in a CMOS circuit. This is typically sufficient as the dynamic power dissipation in a given circuit may be many times that of the static power (e.g., leakage current) dissipation. However, it may be advantageous to additionally control leakage current. Hence, some embodiments of the present invention also provide an ability to limit leakage current. In particular, in some embodiments of the present invention power management module 110 includes an ability to shut off power to individual portions of hard disk drive system 100. In such cases, the individual design portions may be arranged in power islands or areas where a variety of circuitry share a common power source that are distinct from other areas of circuitry. Thus, for example, read channel module 130 and interface controller 120 may be implemented such that they receive power from an overall power supply, but that power to each of read channel module 130 and interface controller 120 may be separately disabled and enabled. Thus, by disabling power to read module 130 and enabling power to interface controller 120, both dynamic and static power dissipation by read channel module 130 is eliminated, and yet the functionality of interface controller 120 is maintained.

This multi-voltage island topology becomes increasingly important as designs continue to transition through different technologies. For example, in one technology the dynamic power dissipation may dwarf any static power dissipation. However, in another technology, static power dissipation may be significant compared to dynamic power dissipation. In particular, in some technologies leakage issues may be major contributors to any overall power dissipation. Shutting down un-used logic completely by removing its power source removes this leakage parameter and thereby lowers the overall system power consumption in the Standby and Sleep modes of operation.

In one particular embodiment of the present invention, a crystal oscillator circuit sourcing the system clock may be implemented on a power island. In operation, power may be removed from the power island thereby rendering the crystal oscillator inoperable. This provides for a dramatic power savings, but also renders hard disk drive circuit substantially inoperable. To regain the operability of disk drive system 100, power is reapplied to the power island including the crystal oscillator circuit. A crystal oscillator circuit can take a substantial amount of time to stabilize after power on. To reduce the amount of time that disk drive circuit 100 remains without a system clock, a ring oscillator or other oscillator may be used in place of the crystal oscillator circuit to provide the system clock upon power up. In such a situation, state prediction module 115 may be used to initially select the ring oscillator upon power up, and then to replace the output of the ring oscillator with that of the crystal oscillator circuit once the crystal oscillator circuit has stabilized.

In some particular embodiments of the present invention, power management module 110 includes an interface to interface controller 120 that in some embodiments of the present invention is used by hard disk drive system 100 to receive power management commands from a host controller. Thus, as just one of many examples, a host may command three levels of operation: awake, standby and sleep. No matter which mode is selected, when a media access command such as the previously described read and write commands is received, hard disk drive system 100 must initiate operations to service the received command. Depending upon the mode in which hard disk drive 100 is currently operating, initiating operations to service the received command may take different amounts of time. Thus, there exists a trade off between response time and power dissipation. This trade off can vary with how much the device is currently being used and how quick of a response time is required by a given application. Thus, for example, in portable devices where power is at a premium, response time may be sacrificed in order to minimize power dissipation. In contrast, for a fixed device that has an unlimited source of power, response time may be more important and a less aggressive power management scheme may be implemented.

In particular, when commanded to operate in the awake mode, power management module 110 would assure power distribution sufficient to respond to read and write requests with only a minimum of delay. Further, in this mode, state prediction module 115 in combination with power management module 110 may operate to control clock distribution using the previously described event driven sequencing. In contrast, when commanded to operate in standby mode, power management module 110 would minimize power dissipation while at the same time providing a predetermined delayed response time that would allow for full distribution of power upon receiving a read or write request. As yet another contrast, when commanded to operate in sleep mode, power management module 110 would drastically curtail power distribution such that a significant delay would be incurred any time it was necessary to respond to a received read or write request. In some cases, such a sleep mode may include a nearly complete elimination of power from hard disk drive system 100. Such a complete removal of power provides for dramatic power savings and in some cases where substantial caching is provided by a host computer or device, the negative effects of such a power down are limited. Transitioning from such a sleep mode to some operational mode may include the aforementioned transition between sourcing the system clock from a ring oscillator circuit to a crystal oscillator circuit.

Figure 2A:
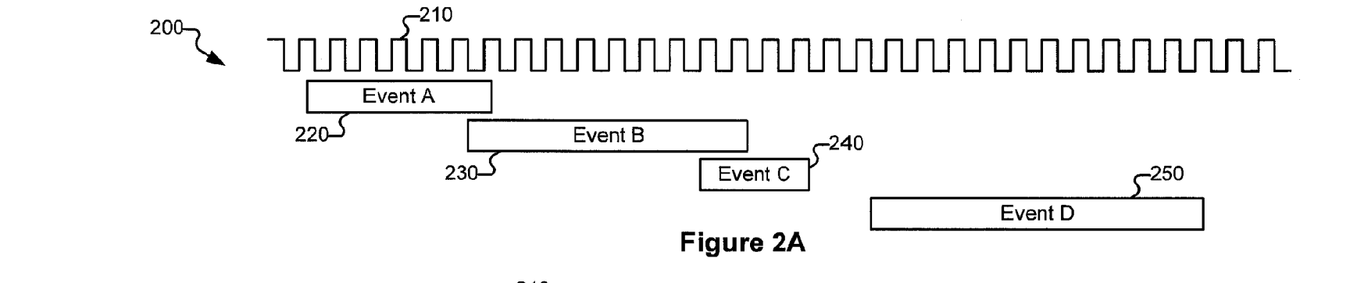
FIG. 2a is a timing diagram showing an exemplary operation of a circuit without the benefit of a state prediction module.

Turning to FIG. 2a, a timing diagram 200 depicts an exemplary operation of a circuit without the benefit of a state prediction module 115. As shown, an operation including four distinct events (i.e., event A 220, event B 230, event C 240 and event D 250) is implemented in circuitry that is synchronized using a system clock 210. Thus, by removing system clock 210 all circuitry associated with the aforementioned events are rendered inoperable. Further, the circuitry may not be designed on an event basis such that a clock may be provided only when a given event is underway. Rather, the circuitry may be designed on a module basis where power and/or clocking is applied to a particular module.

Figure 2B:
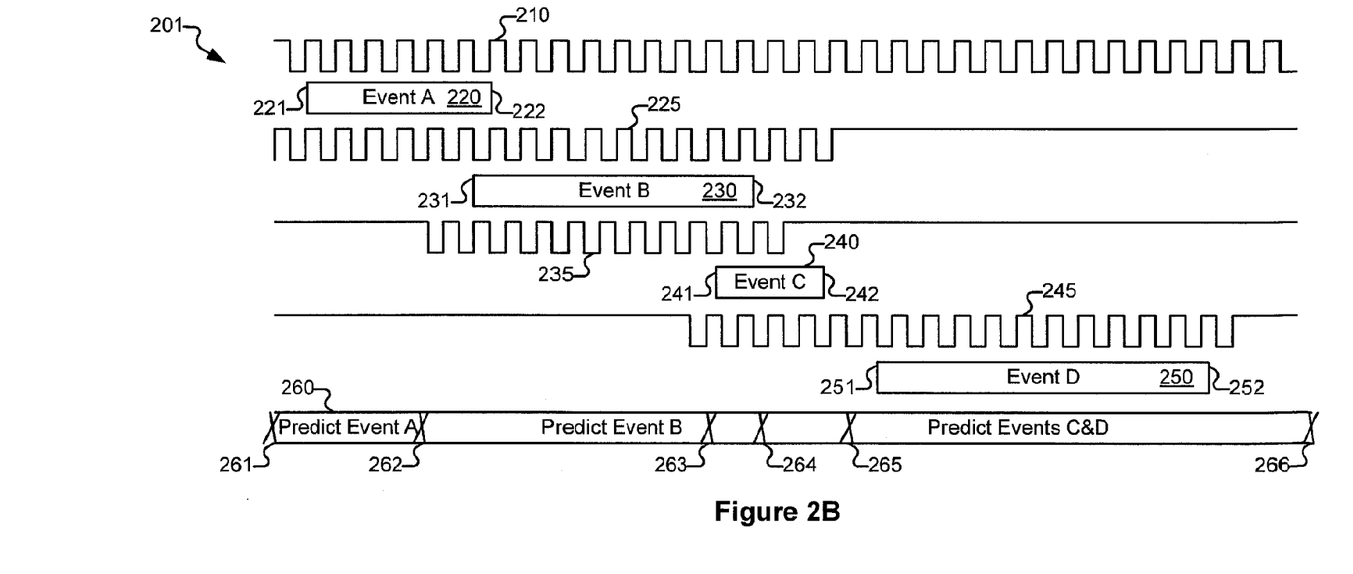
FIG. 2b is a timing diagram of an exemplary circuit employing a state prediction module in accordance with one embodiment of the present invention.

Turning to FIG. 2b, a timing diagram 201 depicts operation of an exemplary circuit employing a state prediction module 115 in accordance with one embodiment of the present invention. As shown, a clock 225 is associated with event A 220, a clock 235 is associated with event B 230, and a clock 245 is associated with both event C 240 and event D 250. Each of the aforementioned event clocks may be derived from system clock 210. Event A 220 includes a beginning 221 and an ending 222, event B 230 includes a beginning 231 and an ending 232, event C 240 has a beginning 241 and an ending 242, and event D has a beginning 251 and an ending 252. The aforementioned events may be implemented with distinct circuitry such that clocks can be applied and removed on an event by event basis. This is in stark contrast to the application and removal of clocks on a module basis as was shown in FIG. 2a. Also, event A 220, event B 230, event C 240 and event D 250 may be chosen such that they perform a sequence of functions within an overall operation. Thus, for example, event A 220, event B 230, event C 240 and event D 250 may be four sequential processes performed in relation to a read from a hard disk drive. In any case, the events occur in a predictable relationship one to another once the overall operation is selected and initiated. Thus, for example, where the operation is a hard disk drive write operation, the four events would each implement a step in the process of writing information to a hard disk drive. In such a case, for example, event B 230 may begin (beginning 231) a known number of clock cycles after event A 220 starts (i.e., beginning 221), and event C 240 may begin (i.e., beginning 241) a known number of clock cycles after the start of event B 230 (i.e., beginning 231), and event D 250 may begin (i.e., beginning 251) a known number of clock cycles after the conclusion of event C 240 (i.e., ending 242). Each of the events or subset groups of the events are implemented in circuitry that is designed such that a clock may be applied to one event or group of events without applying a clock to another event or vice versa. Based on the disclosure provided herein, one of ordinary skill in the art will recognize a variety of operations that may be disaggregated into multiple events. Further, one of ordinary skill in the art will appreciate a variety of circuit designs and/or constructions that may be used to maintain one circuit associated with one event exclusive of a clock used to clock another circuit associated with another event.

Because the approximate or exact beginning and/or ending point of each of events 220, 230, 240, 250 are known, state prediction module 115 can be designed to provide a clock start signal set that causes a clock for an upcoming event to begin clocking, and to disable a clock for a completing event. This signal set is provided to power management module 110 that is tasked with providing the selected clocks. An example of such a signal set is shown as bus data 260 of timing diagram 201.

In operation, power management module 110 is made aware of a particular operation that is to be implemented. Power management module 110 provides this information to state prediction module 115 that in turn identifies a sequence of events that are associated with the particular operation. In some cases, this sequence information is accessed from sequence code memory 117. In addition, power management module 110 provides an indication that the operation has been started. State prediction module 115 then provides a series of control signals indicating the occurrence of different events within the process. These control signals are shown as event predictions occurring between period markers 261, 262, 263, 264, 265, 266. In particular, the beginning of event A 220 is signaled by a signal assertion indicated as transition 261, the beginning of event B 230 is signaled by a signal assertion indicated as transition 262, the beginning of event C 240 is signaled by a signal assertion indicated as transition 263, the end of event B is signaled by a signal assertion indicated as transition 264, the end of event A 220 is signaled by a signal assertion indicated as transition 265, and the end of event D is signaled by a signal assertion indicated as transition 266. At this juncture, it should be noted that a clock associated with a particular event may be maintained for some period after the event is completed to assure that data associated with the event is fully clocked. Of course, such a determination depends upon the circuit used to support the event. Further, it should be noted that a clock associated with the particular event may be enabled one or two clock cycles before it is needed. This limits the potential of glitches on a particular clock having an adverse impact on the operation of an associated event. Thus, in some cases, circuits associated with the events are each implemented with an event enable that effectively causes the circuit to ignore an incoming clock until the enable (i.e., a signal coextensive with the events on timing diagram 201) is asserted.

Upon assertion of an event indicator via bus data 260, power management module 110 applies or removes the appropriate clock(s). Thus, following timing diagram 201, upon transition 261, power management module 110 applies clock 225. This clock is applied some time before it is required by event A 220, and in this case is held until three clock cycles after the end of event B 230 as indicated by transition 265. Upon transition 262, clock 235 is applied by power management module 110. As shown, clock 235 is applied before it is needed by event B 230, and remains until the end of event B 230 as indicated by transition 264. Clock 245 is applied upon transition 263 which occurs before event C 240, and remains until after the conclusion of event D as indicated by transition 266. It should be noted that FIG. 2b is merely exemplary and that based on the disclosure provided herein, one of ordinary skill in the art will recognize a variety of events, clocks and transitions that may be implemented depending upon particular functional and power requirements of a given circuit.

Figure 3:
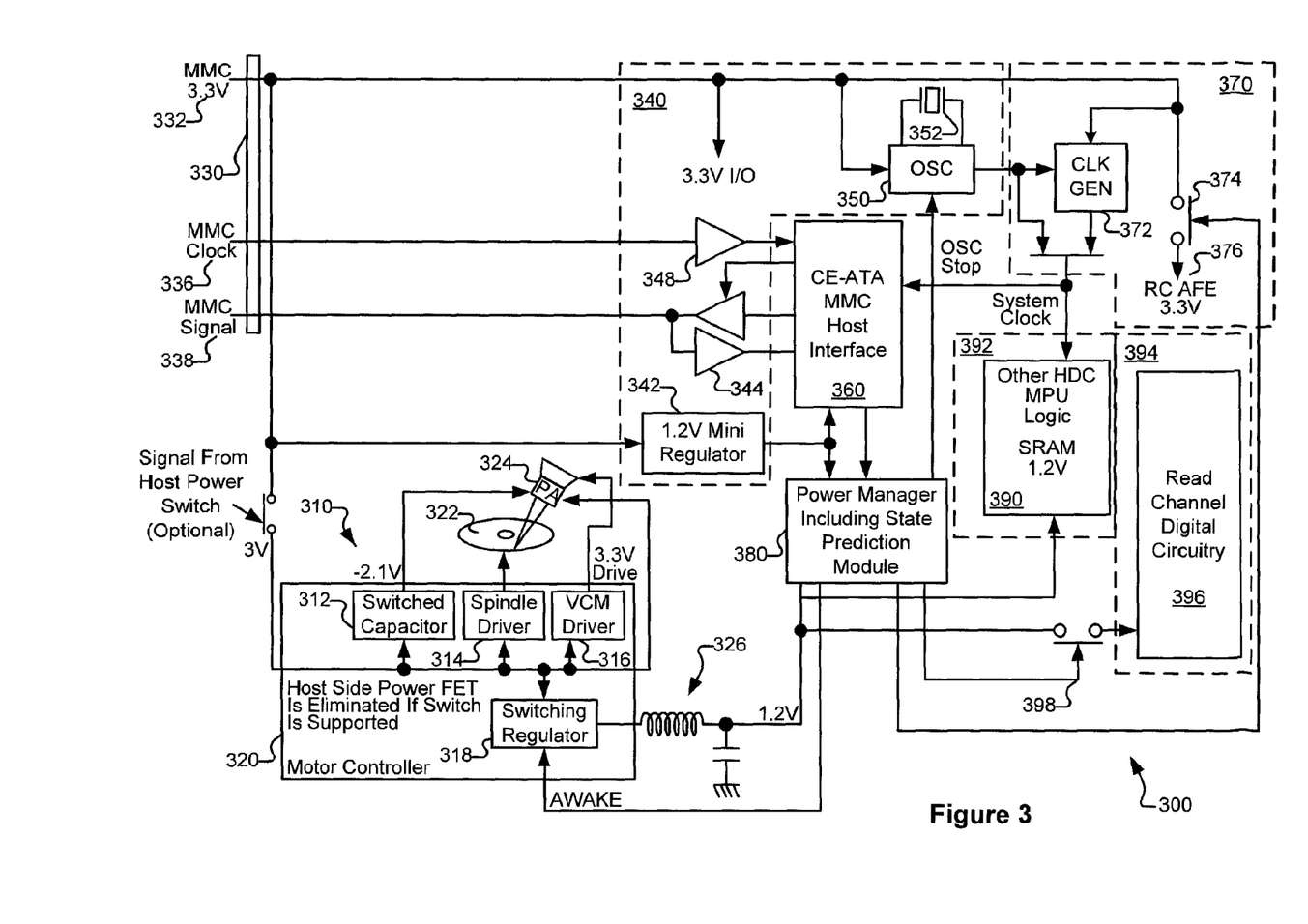
FIG. 3 illustrates a hard disk drive system including a power manager system aided by a state prediction module in accordance with some embodiments of the present invention.

Turning now to FIG. 3, a hard disk drive system 300 is shown including a power manager system 380 aided by a state prediction module in accordance with some embodiments of the present invention. System 300 includes a standard controllable storage system 310 that includes a motor controller 320, a storage platter 322 and a read/write head assembly 324. Motor controller 320 includes a switching regulator 318, a switched capacitor 312, a spindle driver 314 and a voice coil motor driver 316. It should be noted that controllable storage system 310 is well known in the art and that one of ordinary skill in the art upon reading this disclosure would be able to replace controllable storage system 310 with other known systems to which power management in accordance with one or more embodiments of the present invention may be applied. Motor controller 320 is electrically coupled to a regulated power supply via an LC filter 326. Based on the disclosure provided herein, one of ordinary skill in the art will recognize other filters that may be used in relation to the present application.

System 300 further includes an MMC interface 330 by which MMC Power 332, an MMC clock 336 and an MMC signal 338 are provided to an MMC host interface circuit 360 via a clock buffer 348 and a tristate buffer 344. In addition, system 300 includes a mini-voltage regulator 342 operable to generate a 1.2 Volt power source from MMC Power 332. System 300 also includes an oscillator circuit 350 associated with a crystal oscillator 352. Further, system 300 includes a processor and/or other control logic 390 and a power manager circuit 380 in accordance with embodiments of the present invention. System 300 additionally includes a Clock Generation Circuit 372 and Read Channel Digital Circuitry 396.

Power manager circuit 380 provides for controlling power to various power islands 340, 370, 392 and 394 within system 300, as well as supplying distinct clocks to various portions of system 300. Power manager circuit 380 is responsible for gating one or more of the clocks to eliminate dynamic power dissipation associated with the respective portions, and for turning off power to one or more of power islands 340, 370, 392 and 394 to eliminate both dynamic and static power dissipation associated with the respective islands. Further, power manager circuit 380 includes a state prediction module that allows it to predict the need for a clock to particular event circuitry on an event driven basis as was previously discussed in relation to FIG. 1 and FIG. 2 above. In some cases, power manager circuit 380 and/or interface circuit 360 support responding to interface commands running without use of an active clock. In such embodiments, oscillator circuit 350 may be turned off and yet system 300 may be revived using a host command.

System 300 is arranged into distinct power islands 340, 370, 392 and 394 each respectively including the circuitry shown within the adjacent dashed lines. For example, a switch 374 controlled by power manager circuit 380 may be opened such that power is removed from power island 370. As such, all power to Clock Generation Circuit 372 is removed eliminating not only dynamic power dissipation, but also static power dissipation. As previously discussed, a great deal of time delay may be incurred after power is applied to Clock Generation Circuit 327 before a stable system clock is available. To avoid such delay, a ring oscillator may be implemented as part of power manager circuit 380. This ring oscillator may be relied upon to provide the system clock until the clock from Clock Generation Circuit 372 stabilizes. In such a situation, the state prediction module of power manager module 380 may be used to initially provide a clock based on the ring oscillator upon power up, and then to replace the output of the ring oscillator with that of the crystal oscillator circuit once the crystal oscillator circuit has stabilized.

In addition, a switch 398 controlled by power manager circuit 380 may be opened such that power is removed from power island 394. As such, all power to Read Channel Digital Circuitry 396 is removed eliminating not only dynamic power dissipation, but also static power dissipation. While not shown, switches may also be deployed in relation to power island 340 and power island 392 such that power provided to the circuitry associated the particular power islands may be switched off and on under the control of power manager circuit 380. In some embodiments of the present invention, the aforementioned switches are controlled via register bits assigned to one or more of the switches. Thus, for example, switch 398 may be associated with a particular register bit within power manager circuit 380. When the register bit is written with a logic '1' switch 398 may be opened, and when it is written with a logic '0' switch 398 is closed.

System 300 is partitioned into power islands to allow various portions of system 300 that must be continuously powered to be separated from other portions of system 300 that may need to be powered only intermittently. Continuous power is maintained for portions of system 300 that are needed to sensitize system 300 to a wake-up condition and control the power-on sequencing of the system. Such continuously powered portions may be included in a power island that is "always-on" and in some cases is powered by a linear regulation element embedded into system 300. As will be appreciated by one of ordinary skill in the art upon reading this disclosure, the various power islands may be powered by a common power source, but are isolated one from another.

Similarly, power is controlled to controllable storage system 310 via an AWAKE signal 328. In the depicted embodiment of the present invention, power generation is integrated into motor controller 320. When AWAKE signal 328 is a logic '0', power is generated. Alternatively, when AWAKE signal 328 is a logic '1', power is not generated. AWAKE signal 328 may also shut down the power and control to the various motors that are available in a particular hard disk drive system including, for example, a spindle motor and a voice coil motor. Shutting down these motors and parking the heads represents a major system-level power savings, as these electro-mechanical interfaces traditionally consume a major portion of the system current in a hard disk drive system. In some embodiments of the present invention, AWAKE signal 328 is controlled via one or more register bits maintained as part of power manager circuit 380.

In some embodiments of the present invention, one or more programmable discrete I/O are provided by power manager circuit 380 to control operation of system 300. For example, AWAKE signal 328 is provided that controls the power generation circuitry of controllable storage system 310. Other signals may be included to shut down all analog circuitry, to shut down the oscillator circuitry, and/or to shut down all non-essential digital circuitry. Based on the disclosure provided herein, one of ordinary skill in the art will recognize other I/O that may be included to control various other functionality.

Figure 4:
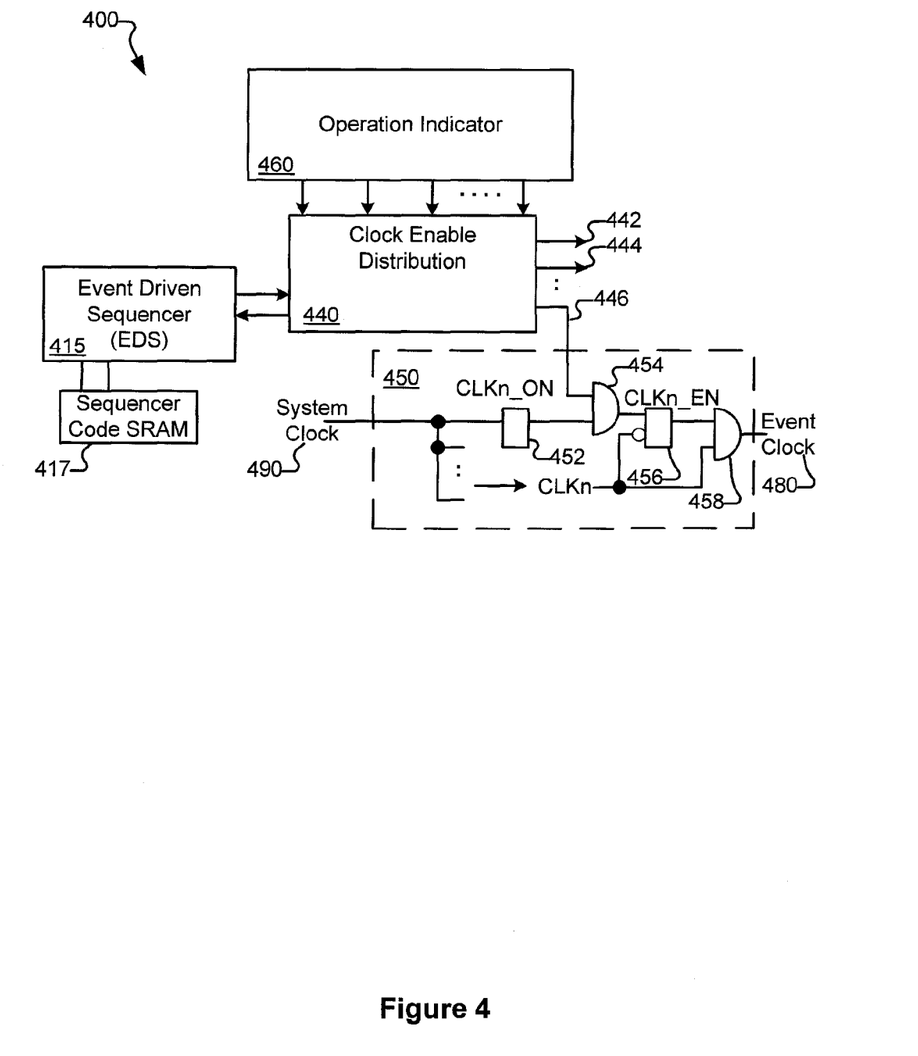
FIG. 4 is a circuit diagram showing the utilization of a state prediction module in accordance with one or more embodiments of the present invention.

Turning to FIG. 4, a circuit 400 is provided to show the utilization of a state prediction module in accordance with one or more embodiments of the present invention. Circuit 400 includes an operation indicator 460 that indicates an operation occurring in relation to the system in which circuit 400 is implemented. Thus, for example, where circuit 400 is implemented in relation to a hard disk drive, operation indicator may identify the start of a disk read or a disk write. In addition, circuit 400 includes an event driven sequencer 415 and a sequencer memory 417. Event driven sequencer 415 receives an indication of the operation being requested and based on the requested operation and an access to sequencer memory 417, determines the events that are to occur in relation to the operation, the sequence and/or timing of the events and circuitry associated with processing the events. Based on this determination, event driven sequencer 415 provides a series of event signals to a clock enable distribution module 440. Clock enable distribution module 440 generates a number of clock enables 442, 444, 446 that are used to control the generation of respective event clocks 480. In some particular embodiments, clock enable distribution module 440 is implemented as a crossbar circuit as is known in the art. Thus, as used herein, the phrases "clock drive crossbar circuit" or "clock crossbar circuit" are used in their broadest sense to mean any crossbar circuit capable of providing clock enables and/or clocks based upon a multi-dimensional input stimuli. Event clocks 480 are then distributed to circuitry associated with the given events. Event clocks 480 are derived from a system clock 490 using a clock gating circuit 450.

In some cases, clock gating circuit 450 may provide an initial glitch when event clock 480 is initial enabled and when event clock is initially disabled. In such cases, event driven sequencer 415 causes application of an enable before event clock 480 is provided, and maintains the enable after event clock is needed. In this way, any initial glitches are ignored by the event circuit associated with event clock 480. Alternatively, clock gating circuit 450 may provide for a glitchless transition between assertion and deassertion of event clock 480. One example of such a glitchless clock gating circuit 450 is depicted. As shown, clock gating circuit 450 includes a control 452 for system clock 490 that may be used to disable all clocks at the source. System clock 490 is logically anded with event clock enable 446 using an AND gate 454, and the output of AND gate 454 is clocked into a register 456 using an inverted version of system clock 490. The inverted version of system clock 490 is then logically anded with the output of register 456 using an AND gate 458. The output of AND gate 458 is event clock 480. Based on the disclosure provided herein, one of ordinary skill in the art will appreciate a variety of other approaches that may be used to derive event clock 480 based on a driving clock and a clock enable that either operates with or without glitches.

Figure 5:
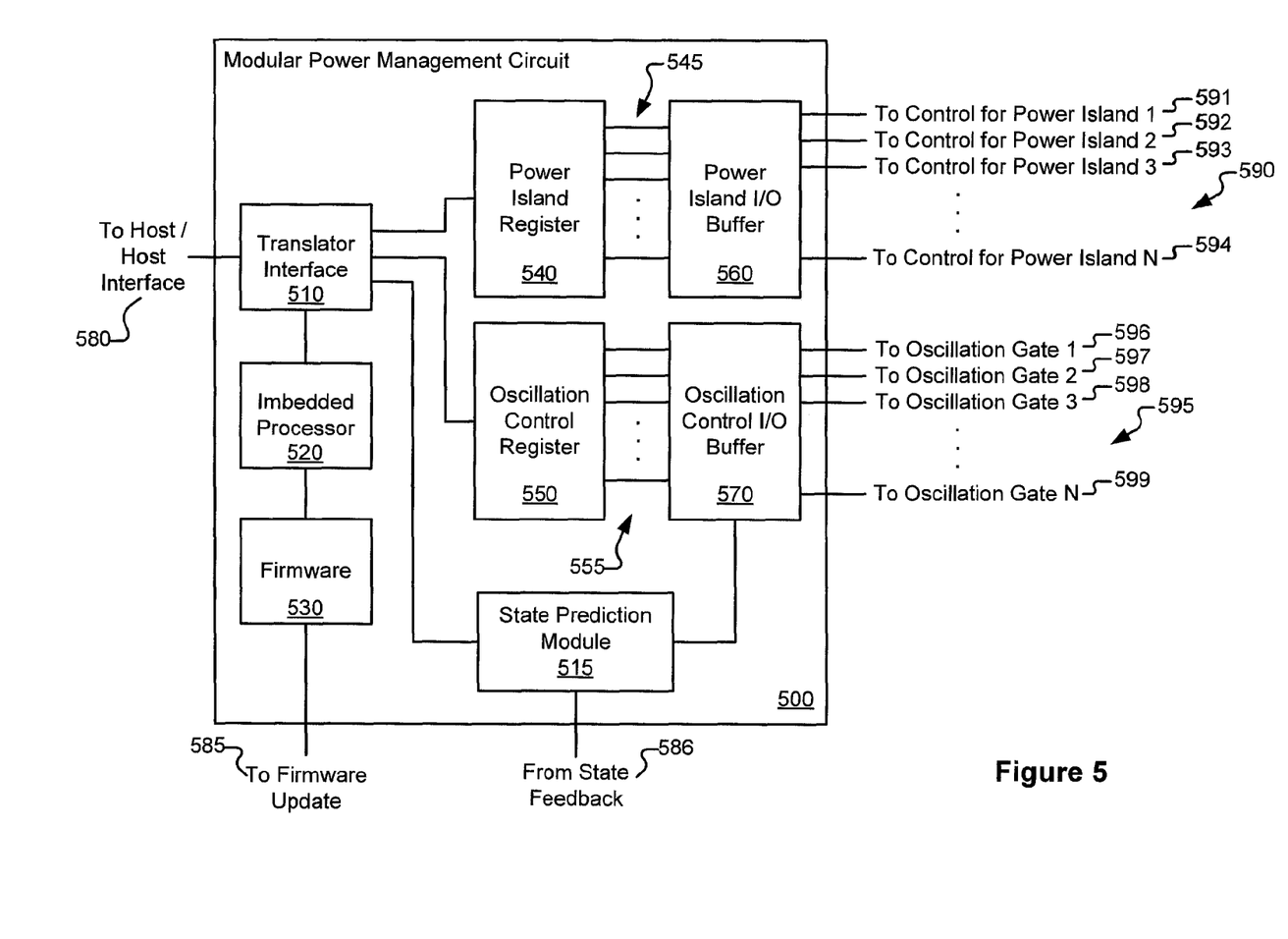
FIG. 5 depicts a power management circuit including a state prediction module in accordance with one or more embodiments of the present invention.

FIG. 5 depicts a power management circuit 500 including a state prediction module 515 in accordance with one or more embodiments of the present invention. Power management circuit 500 includes a translator interface 510 that may receive commands via a host or host interface 580. Thus, for example, where the host is an ATA hard disk drive system, various ATA commands may be provided to modular power management circuit 500 via translator interface 510. In turn, translator interface 510 converts the standardized command from host interface 580 into a power management command that is tailored to implement a power management scheme that is highly tailored to the system in which modular power management circuit 500 is deployed. In some cases, translator interface 510 is implemented via or communicably coupled to an embedded processor 520 that is capable of performing some or all of the translation function. Embedded processor 520 executes firmware 530 that can be updated via a firmware update interface 530. As such, power management implemented via modular power management circuit 500 may be modified post deployment to provide a different power management scheme depending upon a particular end user's needs.

In operation, translator interface 510 receives commands from a host 580 and converts the commands into register writes. In particular, translator interface 510 writes a power island register 540 and an oscillation control register 550. Each bit (545) of power island register 540 is associated with a respective bit of a power island I/O buffer 560, and each bit (555) of oscillation control register is associated with a respective bit of an oscillation control I/O buffer 570. Power island I/O buffer 560 drives a number of power island control signals 590 including power island controls 1-N (591-594). A designer can utilize each of power island control signals 591-594 to drive respective switches gating power to various power islands formed within the system in which modular power management circuit 500 is deployed. Similarly, oscillation control I/O buffer 570 drives a number of oscillation control signals 595 including oscillation control signals 1-N (596-599). A designer can utilize each of oscillation control signals 596-599 to drive respective circuitry turning off oscillators or gating clocks used within the system in which modular power management circuit 500 is deployed. Thus, as a particular example, one of oscillation control signals 596-599 may shut down a particular oscillator, another of oscillation control signals 596-599 may gate all clocks derived from the particular oscillator, and yet another of oscillation control signals 596-599 may gate some but not all of the clocks derived from the particular oscillator. These three distinct oscillation controls aid in implementing different levels of power management and/or increasing or decreasing the aggressiveness of power management within any level of power management. Based on the disclosure provided herein, one of ordinary skill in the art will appreciate the myriad of power management control that may be implemented using a modular power management circuit in accordance with embodiments of the present invention.

In operation, state prediction module 515 monitors commands coming in from interface 510 and determines the sequence of events triggered by the commands. State prediction module 515 then provides state indication signals to oscillation control I/O buffer 570. The state signals from state prediction module 515 are used as an overlay to the existing clock distribution control. Thus, for example, Oscillation Control Register 550 and Oscillation Control I/O Buffer 570 may provide individual clocks to respective circuit modules, and each of the respective circuit modules may include circuitry tailored to perform a number of events that when combined perform the function of the respective circuit module. Thus, using Oscillation Control I/O Buffer 570, all of the clocking to a circuit module may be deasserted. Further, using the state sequencing signals provided by state prediction module 515, Oscillation Control I/O Buffer 570 can provide event driven clock control as discussed above in relation to FIG. 1 and FIG. 2.

Figure 6A:
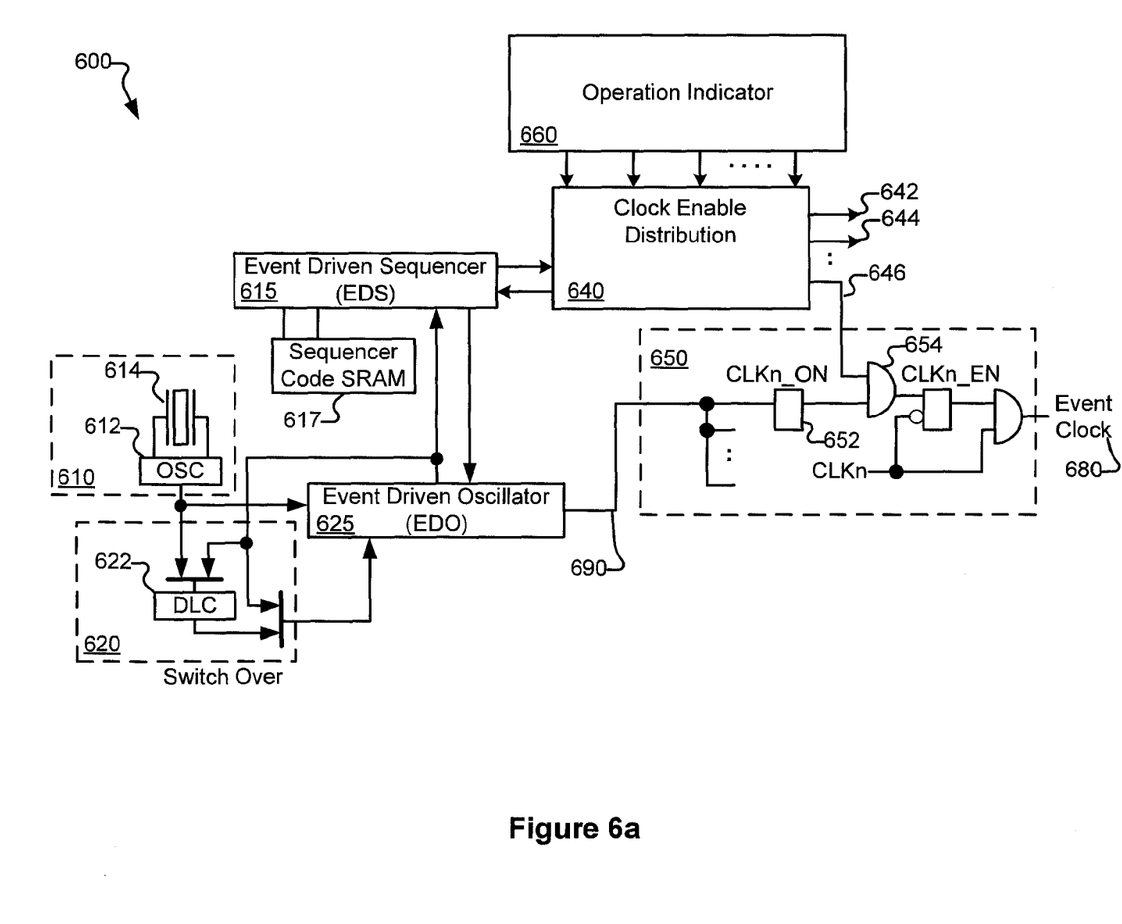
FIG. 6 depict a circuit combining the operation of both state prediction and event driven oscillation in accordance with various embodiments of the present invention.

Turning to FIG. 6, a circuit 600 is depicted that combines the operation of both state prediction (i.e., event driven sequencing) and event driven oscillation in accordance with various embodiments of the present invention. Circuit 600 includes an operation indicator 660 that indicates an operation occurring in relation to the system in which circuit 600 is implemented. Thus, for example, where circuit 600 is implemented in relation to a hard disk drive, operation indicator 640 may identify the start of a disk read or a disk write. In addition, circuit 600 includes an event driven sequencer 615 and a sequencer memory 617. Event driven sequencer 615 receives an indication of the operation being requested and based on the requested operation and an access to sequencer memory 617, determines the events that are to occur in relation to the operation, the sequence and/or timing of the events and circuitry associated with processing the events. Based on this determination, event driven sequencer 615 provides a series of event signals to a clock enable distribution module 640. Clock enable distribution 640 generates a number of clock enables 642, 644, 646 that are used to control the generation of respective event clocks 680. In some particular embodiments, clock enable distribution module 640 is implemented as a crossbar circuit as is known in the art. Event clocks 680 are then distributed to circuitry associated with the given events. Event clocks 680 are derived from a system clock 690 using a clock gating circuit 650.

Clock gating circuit 650 includes a control 652 for system clock 690 that may be used to disable all clocks at the source. System clock 690 is logically anded with event clock enable 646 using an AND gate 654, and the output of AND gate 654 is clocked into a register 656 using an inverted version of system clock 690. The inverted version of system clock 690 is then logically anded with the output of register 656 using an AND gate 658. The output of AND gate 658 is event clock 680.

System clock 690 may be sourced from two or more clock sources 610, 620. In one particular embodiment of the present invention, clock source 610 includes a crystal oscillator 614 and an oscillation circuit 612. In the embodiment, clock source 620 includes a ring oscillator 622. The output of both oscillation circuit 612 and ring oscillator 622 are provided to an event driven oscillation module 625. Event driven oscillation module 625 selects which of ring oscillator 622 and oscillation circuit 612 will drive system clock 690. In one scenario, event driven oscillation module may also be responsible for applying and removing power from clock source 610. In such cases, clock source 610 may not be able to recover quickly enough upon re-application of power. Because of this, event driven oscillation module 625 may initially select clock source 620 upon power up, and after clock source 610 has been given sufficient time to stabilize it is selected to drive system clock 690.

Figure 6B:
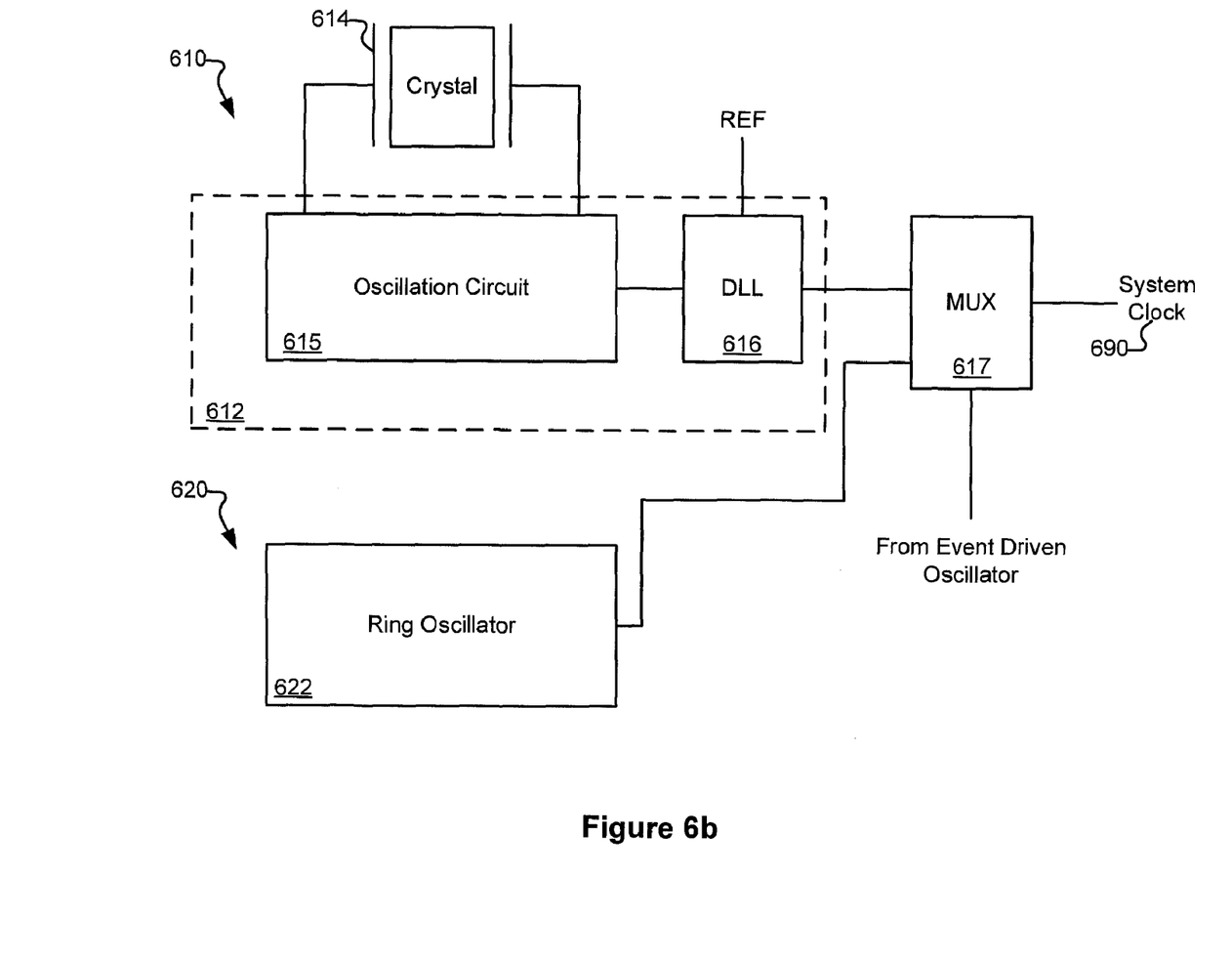

Turning to FIG. 6b, a detailed diagram of clock source 610, clock source 620 and event driven oscillation module 625 is provided. As shown, clock source 610 includes crystal oscillator 614, and oscillation circuit 612 that includes an oscillator control circuit 615 driving a phase locked loop circuit or delay locked loop (DLL) circuit 616. The output of phase locked loop circuit or delay locked loop (DLL) circuit 616 and the output of ring oscillator 622 are provided to a multiplexer 617 included in event driven oscillation module 625. Event driven oscillation module 625 drives the select input of multiplexer 617 causing selection between clock source 610 and clock source 620.

In other embodiments of the present invention, another phase locked loop circuit (not shown) is provided and driven by ring oscillator 622. In such a case, ring oscillator 622 drives the additional phase locked loop circuit and the output of the phase locked loop circuit is provided to multiplexer 617. In yet other embodiments of the present invention, a single phase locked loop circuit (e.g., phase locked loop circuit or delay locked loop (DLL) circuit 616) may be used to lock to both clock source 610 and clock source 620. In such a case, the output of oscillation circuit 615 and the output of ring oscillator 622 are both provided to multiplexer 617, and the output of multiplexer 617 is provided to phase locked loop circuit or delay locked loop (DLL) circuit 616. In this case, phase locked loop circuit or delay locked loop (DLL) circuit 616 drives system clock 690 directly. Based on the disclosure provided herein, one of ordinary skill in the art will recognize a variety of other circuits that may be utilized in accordance with one or more embodiments of the present invention.

Figure 7A:
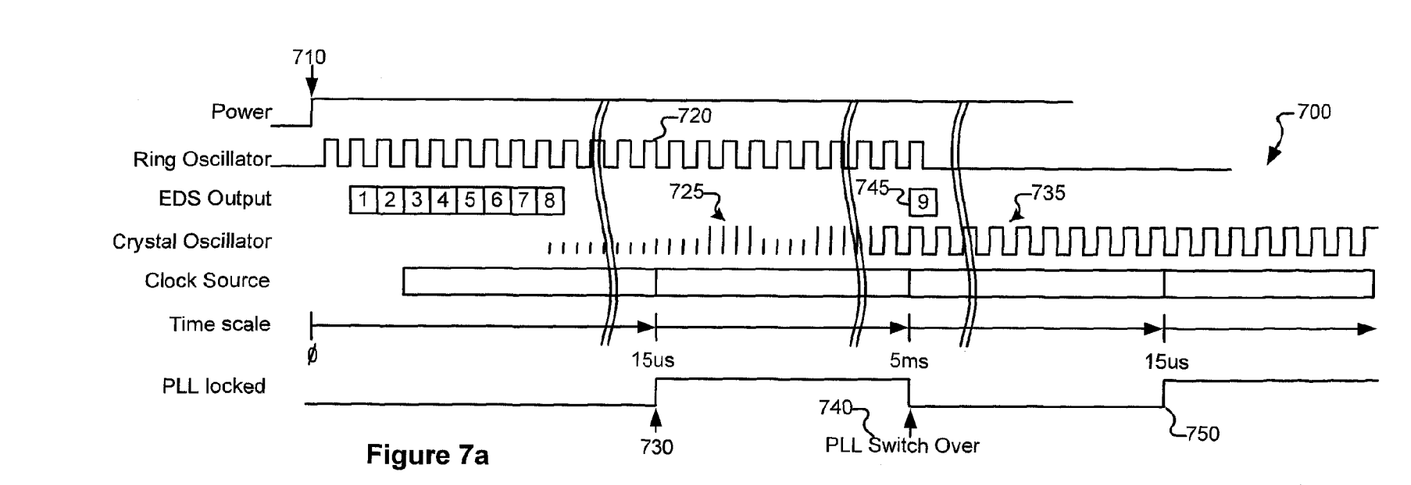
FIG. 7 are timing diagrams depicting exemplary operation of the circuit of FIG. 6 in accordance with one or more embodiments of the present invention.

FIG. 7 are timing diagrams depicting exemplary operation of the circuit of FIG. 6 in accordance with one or more embodiments of the present invention. FIG. 7a provides a timing diagram showing a situation where a ring oscillator is used to source the system clock while the crystal oscillator is stabilizing. In particular, at an initial time 710 power is applied to the circuit of FIG. 6. Shortly thereafter ring oscillator 622 begins providing reasonably stable clock pulses 720. Clock pulses 720 are used to drive the operation of event driven sequencer 615 as previously described. Where a phase locked loop is used in relation to the ring oscillator, the loop may lock to the output of the ring oscillator at a second time 730. At a predetermined point 740 after the application of power 710, it may be safe to assume that the crystal oscillator has completed a period of unstable output 725 and entered a period of stable output 735. Point 740 is indicated by the assertion of an output 745 of event driven sequencer 615. Based on output 745, event driven oscillation module 625 asserts the select on multiplexer 617 such that the crystal oscillator is selected. Where a single phase locked loop is used for both clock sources, this switching causes the phase locked loop to unlock. At some point later 750, the phase lock loop locks to the crystal oscillator. It should be noted that the time period between point 710 and point 730 may be relatively short compared with the time period between point 710 and point 740. Similarly, the time period between point 740 and point 750 may be relatively short compared with the time period between point 710 and point 740. In one particular instance, the period between point 710 and point 730 and between point 740 and point 750 is approximately fifteen microseconds, while the period between point 710 and point 740 is approximately five milliseconds.

Figure 7B:
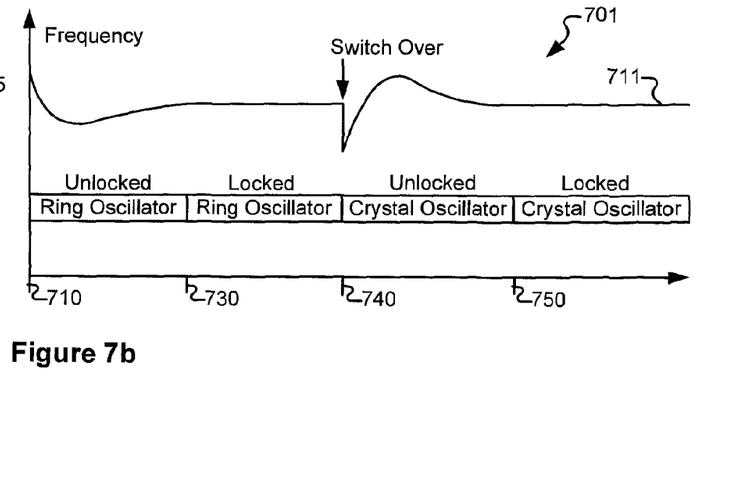

Turning to FIG. 7b, detail of the switchover discussed above in relation to FIG. 7a is shown. In particular, a timing diagram 703 includes arrows 707, 709 showing the dependency of the system clock from clock 720 sourced by the ring oscillator and clock 735 sourced from the crystal oscillator. As shown, clock 720 and clock 735 are not phase aligned. This results in the loss of one or more clocks of the system clock when the switch over occurs at point 740. Further, it should be noted that in some cases clock 735 from the crystal oscillator may not have the same frequency as clock 720 from the ring oscillator. This can also result in the loss of one or more clocks from the system clock. Timing diagram 701 depicts a frequency 711 of the system clock over time as the phase lock loop is locking and unlocking. In particular, between point 710 and point 730, the ring oscillator is selected but has not been locked. During this period, frequency 711 is fluctuating. Between point 730 and point 740, the ring oscillator is selected and locked. Over this period, frequency 711 is stable. At switch over point 740, the crystal oscillator is selected. Because of the phase and/or frequency difference of clock 720 sourced from the ring oscillator and clock 735 sourced from the crystal oscillator 735, one or more clock cycles of the system clock are dropped causing a precipitous fall in frequency 711. Frequency 711 recovers as clock 735 from the crystal oscillator begins to drive the system clock. Frequency 711 is somewhat variable between point 740 and point 750 as the phase locked loop has not yet locked. Finally, after point 750 where the phase locked loop has locked, frequency 711 stabilizes.

As described above, using state prediction to implement event driven sequencing provides an ability to manage the system power profile by controlling the clock generation and management logic on an event by event basis. Further, by adding control over oscillation sources, power management may be more aggressively implemented without undue increases in restart delays. Thus, for example, when a device is placed in a STANDBY mode, clocking may be maintained using a ring oscillator that continues as the source of the system clock until an external crystal oscillator is re-powered and becomes stable. This allows for removing power from a crystal oscillator circuit where in some cases this would not have been feasible. In such a system, a relatively power hungry crystal oscillation circuit can be powered down and replaced by a ring oscillator circuit with its lower power demands. While a ring oscillator may not provide as accurate of an output clock signal as a crystal oscillator circuit, the signal is suitable for many operations accomplished as a circuit is revived from a low power mode. When this ring oscillator circuit starts its oscillation immediately by a trigger caused by an external event it may be referred to as Event Driven Oscillation. Such a trigger may be, for example, a discrete wake-up signal passed from the host bus interface module.

Figure 8:
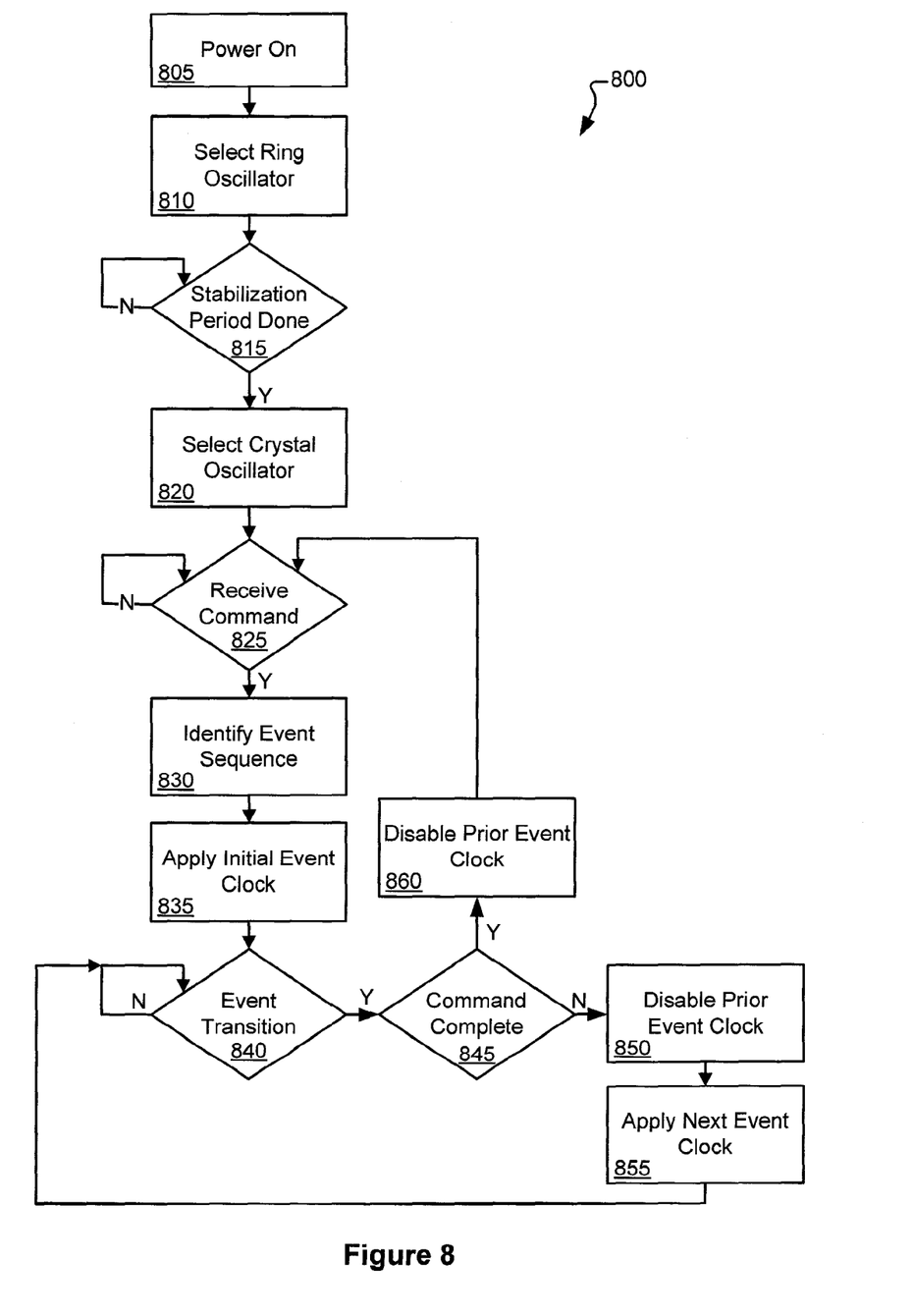
FIG. 8 is a flow diagram depicting a method for event sequenced clock distribution in accordance with various embodiments of the present invention.

FIG. 8 is a flow diagram 800 depicting a method for event sequenced clock distribution in accordance with various embodiments of the present invention. Following flow diagram 800, power is applied to a circuit including both event driven sequencing and event driven oscillation as discussed above in relation to FIGS. 1-7 (block 805). Upon power on (block 805), a clock source with a relatively quick response time is selected (block 810). The selected clock source is used to derive the system clock. In one particular embodiment, the initially selected clock is a ring oscillator. However, based on the disclosure provided herein, one of ordinary skill in the art will recognize other clock sources that exhibit reasonable response times that can be used in relation to one or more embodiments of the present invention. A delay period is waited to allow another clock source to stabilize (block 815). During this period, the initially selected clock source is continually used to source the system clock. Once the delay period has passed (block 815), a second clock source is selected to replace the initially selected clock source to derive the system clock (block 820). In one particular embodiment of the present invention, the second clock source is a crystal oscillator circuit.

It is also determined whether a particular command has been received (block 825). The command indicates one or more operations that are to be performed. The operations are segmented into events that are each handled by circuitry associated with the events. The sequence of the aforementioned events is identified (block 830). This may be done, for example, by accessing a memory element containing sequencing information. A clock associated with the initial event in the sequence is enabled and applied (block 835).

Enabling the clock may include providing an enable signal that is used to gate the system clock driving the particular event circuitry. Applying the clock may include providing an event clock derived from the system clock and dependent upon the enable signal. It is then determined if a transition between events is occurring (block 840). Where no transition is occurring (block 840), the previously applied event clock is maintained. Alternatively, where a transition is occurring (block 840), it is determined if the last event associated with the command is completing (block 845). Where it is not the last event (block 845), the prior event clock is disabled (block 850) and the next even clock is enabled and applied (block 855). This clock is applied until at least the next event transition (block 840). Alternatively, where it is determined that the last event of the command has completed (block 845), the prior event clock is disabled (block 860), and the next command is awaited (block 825).

In conclusion, the present invention provides novel systems, devices, methods and arrangements for power management. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A synchronous semiconductor circuit, wherein the circuit comprises:
    a first clock source;
    a second clock source;
    a power management controller, wherein the power management controller is operable to:
        apply power to the first clock source via a power island, wherein power to the power island is separately controllable from power to the second clock source;
        select the second clock source for synchronization; and
        upon stabilization of the first clock source, select the first clock source for synchronization.

2. The circuit of claim 1, wherein the second clock source is a ring oscillator circuit, and wherein the first clock source is a crystal oscillator circuit.

3. The circuit of claim 1, wherein the circuit further includes a locked loop circuit, and wherein selecting the first clock source for synchronization includes:
    providing a clock from the first clock source to the locked loop circuit; and
    using the locked loop circuit to lock the clock from the first clock source to a known phase and frequency.

4. The circuit of claim 3, wherein the phase and frequency is the phase and frequency of the second clock source.

5. The circuit of claim 1, wherein the power management controller is further operable to remove power from the power island, wherein power from the first clock source is removed.

6. The circuit of claim 1, wherein the circuit is implemented as part of a hard disk drive system.

7. The circuit of claim 1, wherein the circuit further includes a clock gate governing distribution of the first clock source.

8. The circuit of claim 7, wherein selecting the first clock source for synchronization includes providing a control signal to the clock gate.

9. A method for rapid circuit synchronization, the method comprising:
    providing a first clock source and a second clock source;
    applying power to the first clock source via a power island;
    selecting the second clock source for synchronization, wherein power to the power island is separately controllable from power to the second clock source; and
    upon stabilization of the first clock source, selecting the first clock source for synchronization.

10. The method of claim 9, wherein the second clock source is a ring oscillator circuit, and wherein the first clock source is a crystal oscillator circuit.

11. The method of claim 10, wherein the circuit further includes a locked loop circuit, and wherein selecting the first clock source for synchronization includes:
    providing a clock from the first clock source to the locked loop circuit; and
    using the locked loop circuit to lock the clock from the first clock source to a known phase and frequency.

12. The method of claim 9, wherein the circuit further includes a locked loop circuit, and wherein selecting the second clock source for synchronization includes:
    providing a clock from the second clock source to the locked loop circuit; and
    using the locked loop circuit to lock the clock from the second clock source to a phase and frequency.

13. The method of claim 9, wherein selecting the first clock source for synchronization includes:
    providing a clock from the first clock source to the locked loop circuit; and
    using the locked loop circuit to lock the clock from the first clock source to the phase and frequency.

14. A hard disk drive system, the system comprising:
    a storage medium;
    a storage medium access circuit operable to access the storage medium; and
    a power management control circuit operable to control power used by the storage medium access circuit, wherein the power management control circuit includes:
    a first clock source;
    a second clock source;
    a power management controller, wherein the power management controller is operable to:
        apply power to the first clock source via a power island, wherein power to the power island is separately controllable from power to the second clock source;
        select the second clock source for synchronization; and
        upon stabilization of the first clock source, select the first clock source for synchronization.

15. The system of claim 14, wherein the second clock source is a ring oscillator circuit, and wherein the first clock source is a crystal oscillator circuit.

16. The system of claim 14, wherein the circuit further includes a locked loop circuit, and wherein selecting the first clock source for synchronization includes:
    providing a clock from the first clock source to the locked loop circuit; and
    using the locked loop circuit to lock the clock from the first clock source to a known phase and frequency.

17. The system of claim 16, wherein the phase and frequency is the phase and frequency of the second clock source.

18. The system of claim 14, wherein the power management controller is further operable to remove power from the power island, wherein power from the first clock source is removed.

19. The system of claim 14, wherein the system further includes a clock gate governing distribution of the first clock source.

20. The system of claim 19, wherein selecting the first clock source for synchronization includes providing a control signal to the clock gate.

* * * * *